Oct. 29, 1968   M. H. RAYMOND   3,408,028
SUPPORT BRACKET
Filed July 19, 1967   2 Sheets-Sheet 1
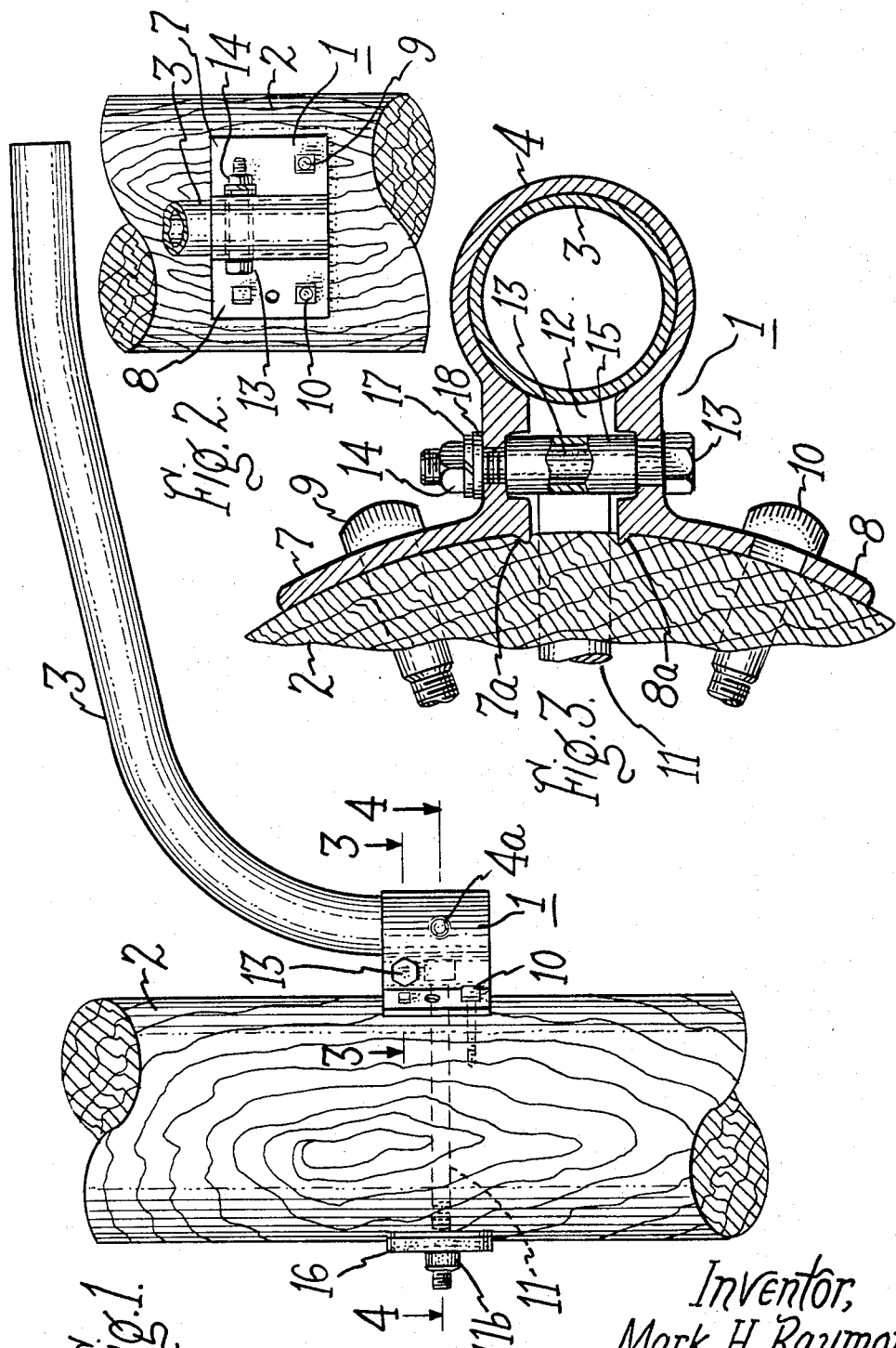
Inventor,
Mark H. Raymond,
by Sidney Greenberg
His Attorney.

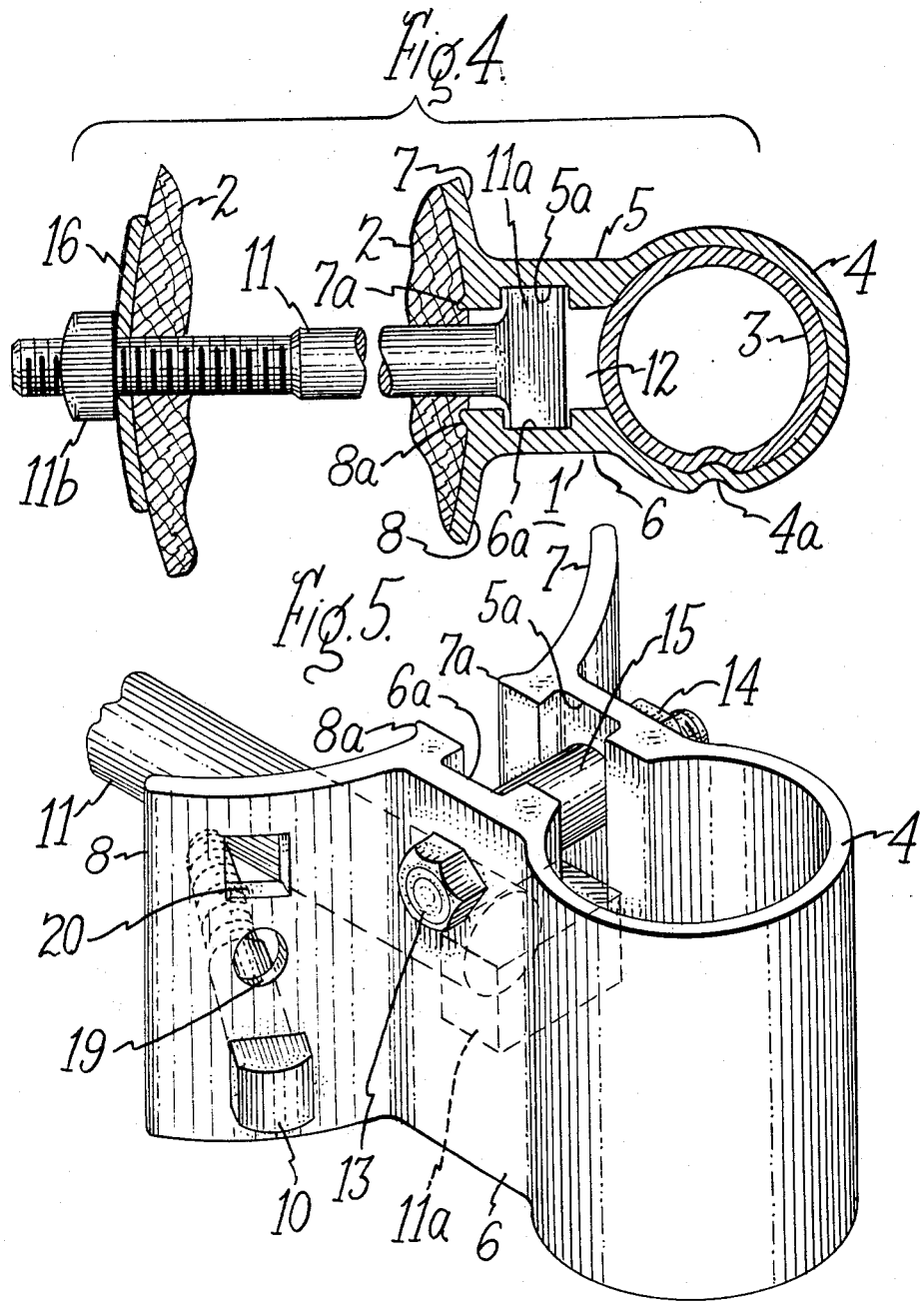

United States Patent Office 3,408,028
Patented Oct. 29, 1968

3,408,028
SUPPORT BRACKET
Mark H. Raymond, Hendersonville, N.C., assignor to General Electric Company, a corporation of New York
Filed July 19, 1967, Ser. No. 654,486
10 Claims. (Cl. 248—221)

ABSTRACT OF THE DISCLOSURE

Bracket for attaching luminaire support arm to a pole comprises a C-shaped portion in which the arm is inserted, spaced arcuate plate portions integrally joined with the C-portion for attachment to the pole, bolt means spanning the spaced intermediate portions between the plate portions and the C-portion for tightening the C-portion about the arm, and bolt means anchored between the arcuate plate portions for securing the bracket to the pole.

---

It is an object of the invention to provide an improved mounting brakcet for attaching a support arm to a vertical pole or the like.

It is another object of the invention to provide a mounting bracket of the above type which has a minimum of parts, is readily and economically manufactured, is easily installed on poles for firmly securing thereon a support arm for luminaires and the like, and occupies a minimum amount of pole space when so installed.

Other objects and advantages will become apparent from the following description and the appended claims.

With the above objects in view, the present invention relates to a mounting device comprising, in combination, a bracket formed of a generally C-shaped portion defining a socket for receiving and clamping a support arm, the C-shaped portion having spaced substantially parallel intermediate portions extending from the open side thereof, and bearing plate portions respectively projecting laterally from the intermediate portions adapted to engage the surface of a supporting member, first means adjustably connecting the spaced intermediate portions for clamping the support arm in the C-shaped portion, and second means for securing the bracket to the supporting member.

The invention will be better understood from the following description taken in conjunction with the accompanying drawings, in which:

FIGURE 1 is a side elevational view of the mounting device of the present invention secured to a wooden pole;

FIGURE 2 is a front elevational view of the mounting device;

FIGURE 3 is an enlarged cross-sectional view of the mounting device shown in FIGURE 1 taken along the line 3—3;

FIGURE 4 is a cross-sectional view of the mounting device shown in FIGURE 1 taken along the line 4—4; and FIGURE 5 is a perspective view of the mounting device.

Referring now to the drawings, and particularly to FIGURE 1, there is shown a mounting device constructed in accordance with the invention comprising a bracket 1 secured to a wooden pole 2 and holding a tubular support arm 3, which in a typical arrangement is adapted to have a lighting fixture (not shown), such as a street luminaire, mounted on its outer end. As seen in FIGURE 3, bracket 1 is formed with a generally C-shaped portion 4 forming a socket in which tubular arm 3 is received and which is integrally formed with spaced parallel intermediate portions 5, 6 projecting outwardly from the open side of C-portion 4 and forming a channel 12 which is open to the surface of pole 2. Formed integrally with the respective intermediate portions 5, 6 are arcuate plate portions 7, 8 extending laterally in opposite directions to engage and conform with the surface of pole to which they are secured by bolts 9, 10 passing through apertures in the plates and screwed into the pole, and by through-bolt 11 which passes diametrically through the pole. The latter bolt is anchored at its head 11a (see FIGURE 4) between arcuate plate portions 7, 8 in channel 12 as more fully explained below, and at its opposite end is threadably engaged by nut 11b, with curved bearing plate 16 interposed between nut 11b, and the pole surface, for tightening the bracket on the pole.

Clamping bolt 13 (see FIGURE 3) passes through apertures in the spaced intermediate portions 5, 6 of the bracket and at the end opposite its head threadably engages the aperture in portion 5, while a lock nut 14 threadably engages that end where it projects from portion 5, with lock washer 17 and bearing washer 18 interposed between nut 14 and portion 5. Bolt 13 thus may be tightened to draw portions 5 and 6 toward each other and thereby clamp tubular arm 3 firmly within socket portion 4. Tubular spacer 15 arranged on bolt 13 within channel 12 keeps bracket portions 5, 6 from being drawn so closely together as to prevent entry of the head of bolt 11 in the channel space defined by portions 5, 6. As seen in FIGURES 3, 4, 5, the inner walls of portions 5, 6 are formed with opposite recesses 5a, 6a defining a vertical slot extending from top to bottom of the bracket and in which bolt head 11a (see FIGURE 4) and spacer 15 are received. The length of spacer 15 is such that the spacing between recesses 5a, 6a (see FIGURES 4, 5) is wide enough to admit bolt head 11a, which is typically square or polygonal, but narrow enough to prevent bolt head 11a from turning in that space while nut 11b is turned on through-bolt 11 for tightening bracket 1 on pole 2.

The adjacent inner edges of plate portions 7, 8 are formed along their length with wedge-shaped, elongated barbs 7a, 8a which penetrate into the surface of pole 2 when through-bolt 11 and lag bolts 9, 10 are tightened, and which thereby assist in anchoring plate portions 7, 8 to the pole and preventing undesirable separation thereof due to stress resulting from the weight of the lighting fixture mounted on support arm 3.

Where it is desired to prevent turning of support arm 3 in the bracket socket 4 and to provide for fixed relationship of these parts, the latter is advantageously provided with an indent 4a (see FIGURE 4) by means of a punching tool or the like, whereby the adjacent part of tubular arm 3 is correspondingly indented, so that these parts are held against movement relative to one another.

Lock nut 14, in conjunction with washers 17, 18 provides a means for securing a ground wire to the bracket. Additional apertures 19, 20 (see FIGURE 5) are optionally provided in plate portion 8 for receiving other bolts to make alternative ground connections if desired.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A mounting device comprising, in combination, a bracket having a generally C-shaped portion defining a socket for receiving and clamping a support arm, said C-shaped portion having spaced substantially parallel intermediate portions extending from the open side thereof, and spaced bearing plate portions respectively projecting laterally from said intermediate portions and having bearing surfaces adapted to engage the surface of a supporting member, first means adjustably connecting said spaced intermediate portions for clamping the support arm in said C-shaped portion, and second means for securing said bracket to the supporting member.

2. A device as defined in claim 1, said intermediate portions defining a channel open at said bearing surfaces of said plate portions, said first means comprising a first bolt spanning said channel and adjustable for varying the spacing between said intermediate portions.

3. A device as defined in claim 2, said intermediate portions being formed to define a slot in said channel extending parallel to the axis of said socket portion, said second means comprising a second bolt having a head at one end arranged in said slot and extending outwardly through said channel along an axis transverse to said first mentioned axis and adapted to extend into the supporting member, and means for securing said second bolt to the supporting member.

4. A device as defined in claim 2, including means arranged in said channel for maintaining said intermediate portions spaced at least a predetermined amount.

5. A device as defined in claim 3, including a sleeve surrounding said first bolt for maintaining said intermediate portions spaced at least a predetermined amount.

6. A device as defined in claim 3, said second means further comprising fastening means associated with said bearing plate portions for securing the latter to the supporting member.

7. A device as defined in claim 1, said bearing plate portions being formed with barb portions for penetrating the surface of the supporting member to retain the respective plate portions in fixed position relative to each other on the supporting member.

8. A device as defined in claim 1, wherein the described portions of said bracket are integral with one another.

9. A device as defined in claim 3, wherein said second bolt has a polygonal head and a nut threadably engaging its opposite end, and means arranged in said channel for maintaining said intermediate portions spaced a predetermined amount when said first bolt is tightened, said predetermined amount being less than the maximum diameter of said bolt head and greater than the minimum diameter of said bolt head.

10. A device as defined in claim 1, a tubular support arm having one end inserted and clamped in said bracket socket, the walls of said socket and said support arm having corresponding registering indentations formed therein for retaining said arm and said bracket socket in fixed relation to one another.

References Cited

UNITED STATES PATENTS

| | | | |
|---|---|---|---|
| 1,451,881 | 4/1923 | McMullen | 248—221 |
| 2,608,369 | 8/1952 | Hocher | 248—221 |
| 2,696,357 | 12/1954 | Elmer | 248—221 |
| 2,721,719 | 10/1955 | Giese et al. | 248—221 |

JOHN PETO, *Primary Examiner.*